United States Patent
Dooley et al.

(10) Patent No.: US 10,915,313 B2
(45) Date of Patent: Feb. 9, 2021

(54) NEAR FIELD COMMUNICATION BOOTLOADER FOR CONFIGURATION AND PROGRAMMING OF ELECTRONIC DEVICES

(71) Applicant: Andium Inc., New York, NY (US)

(72) Inventors: James Dooley, Colchester (GB); Jory Schwach, New York, NY (US)

(73) Assignee: Andium Inc., New York, NY (US)

( * ) Notice: Subject to any disclaimer, the term of this patent is extended or adjusted under 35 U.S.C. 154(b) by 28 days.

(21) Appl. No.: 15/755,368

(22) PCT Filed: Aug. 24, 2016

(86) PCT No.: PCT/US2016/048403
§ 371 (c)(1),
(2) Date: Feb. 26, 2018

(87) PCT Pub. No.: WO2017/035236
PCT Pub. Date: Mar. 2, 2017

(65) Prior Publication Data
US 2018/0260209 A1 Sep. 13, 2018

Related U.S. Application Data

(60) Provisional application No. 62/209,781, filed on Aug. 25, 2015, provisional application No. 62/255,187, filed on Nov. 13, 2015.

(51) Int. Cl.
*G06F 9/44* (2018.01)
*G06F 8/654* (2018.01)
(Continued)

(52) U.S. Cl.
CPC ........... *G06F 8/654* (2018.02); *H04B 5/0031* (2013.01); *H04B 5/0037* (2013.01);
(Continued)

(58) Field of Classification Search
CPC ..... G06F 8/654; H04B 5/0031; H04B 5/0037; G06Q 20/3674; G06Q 20/382; G06Q 30/06
See application file for complete search history.

(56) References Cited

U.S. PATENT DOCUMENTS

2011/0112968 A1 5/2011 Florek et al.
2013/0249479 A1 9/2013 Partovi
(Continued)

OTHER PUBLICATIONS

Hiroki Shibuya et al., A Wireless Charging and Near-field Communications Combination Module for Mobile Applications, IEEE, 2014, retrieved online on Apr. 1, 2020, pp. 763-768. Retrieved from the Internet<URL: https://ieeexplore.ieee.org/stamp/stamp.jsp?tp=& arnumber=6897371>. (Year: 2014).*

*Primary Examiner* — Hanh Thi-Minh Bui
(74) *Attorney, Agent, or Firm* — Dykema Gossett PLLC

(57) ABSTRACT

Systems, methods, and apparatuses for programming and debugging electronic devices using a near field communications device are provided. One apparatus includes an electronic device (101). The electronic device can include a microcontroller (102), wherein the microcontroller includes a bootloader (104), a device memory (103), and a processor configured to execute instructions stored on the device memory. A near field communications (NFC) interface (106) can be in communication with the microcontroller. An antenna (108) can be in communication with the NFC interface and can be configured to be energized by a signal received from an external NFC device (109). An interface memory can be in communication with the NFC interface (106), wherein the interface memory is configured to store data received from the external NFC device, the data included in the signal received from the external NFC device.

10 Claims, 3 Drawing Sheets

(51) Int. Cl.
*H04B 5/00* (2006.01)
*G06Q 20/38* (2012.01)
*G06Q 20/36* (2012.01)
*G06Q 30/06* (2012.01)

(52) U.S. Cl.
CPC ....... *G06Q 20/3674* (2013.01); *G06Q 20/382* (2013.01); *G06Q 30/06* (2013.01)

(56) References Cited

U.S. PATENT DOCUMENTS

2014/0187154 A1    7/2014   Sabouri et al.
2015/0091508 A1    4/2015   Meunier et al.
2016/0233727 A1*   8/2016   Ollikainen .............. H02J 50/30

* cited by examiner

NEAR FIELD COMMUNICATION BOOTLOADER FOR CONFIGURATION AND PROGRAMMING OF ELECTRONIC DEVICES

CROSS-REFERENCE TO RELATED APPLICATION

This application claims priority to U.S. provisional patent application No. 62/209,781, filed Aug. 25, 2015, and to U.S. provisional patent application No. 62/255,187, filed Nov. 13, 2015, which are hereby incorporated by reference as though fully set forth herein.

BACKGROUND

Modern microcontroller (MCU) architectures can use instructions stored on a computer-readable medium (e.g., flash memory) to (re)program the MCU with instructions (e.g., firmware) that can be updated. There are many benefits to this approach which are beyond the scope of this document, including over-the-air field upgrades.

The consequence of this MCU architecture is that a power source and a programmer must be physically attached to each device in order to program the device with customer firmware and configuration data (e.g., serial numbers, security keys, etc.). This is a costly additional overhead that must occur at some point in the supply-chain, post-manufacture and before the device reaches the end-customer.

Over-The-Air updates can provide wireless upgrades to devices once deployed, but rely on the device already having some software operational (e.g., software that is installed, configured and provides for a connection to the device) in order to achieve that update. These methods often make use of active radio hardware that already exists in the device design, but would be otherwise too expensive (e.g., relative to cost of the device) to add.

Modern MCU architectures can be (re)programmed with instructions (e.g., firmware) that is stored in a computer-readable medium (e.g., flash memory). Such programming can be accomplished via a programming device. The connection of such a programming device can be either temporary or permanent, but in both cases will also require a power-source to be connected. Programming a device is a costly overhead that must occur at some point in the supply-chain, post-manufacture and before the device reaches the end-customer.

SUMMARY

Various embodiments of the present disclosure include an electronic device. The electronic device can include a microcontroller, wherein the microcontroller includes a bootloader, a device memory, and a processor configured to execute instructions stored on the device memory. A near field communications (NFC) interface can be in communication with the microcontroller. An antenna can be in communication with the NFC interface and can be configured to be energized by a signal received from an external NFC device. An interface memory can be in communication with the NFC interface, wherein the interface memory is configured to store data received from the external NFC device, the data included in the signal received from the external NFC device.

Various embodiments of the present disclosure include an electronic device. The electronic device can include a microcontroller. Am NFC programmer can be in communication with the microcontroller. An antenna can be in communication with the NFC programmer and can be configured to communicate with an external NFC device. A programmable memory can be in communication with the NFC programmer and the microcontroller. The programmable memory can be configured to store data received from the external NFC device. The data can be included in a signal received from the external NFC device.

Various embodiments of the present disclosure include an electronic device. The electronic device can include a microcontroller, wherein the microcontroller includes, a device memory, and a processor configured to execute instructions stored on the device memory. An NFC interface can be in communication with the microcontroller. An antenna can be in communication with the NFC interface and can be configured to be energized by a signal received from an external NFC device. An interface memory can be in communication with the NFC interface, wherein the interface memory is configured to store data received from the external NFC device, the data included in the signal received from the external NFC device. A power supply can be electrically coupled with the electronic device and can be configured to provide power to the MCU. The microcontroller can be inactive when no power is provided to the electronic device via the power supply and the NFC interface can operate in a passive mode when no power is provided to the electronic device via the power supply.

DETAILED DESCRIPTION

Figure 1:
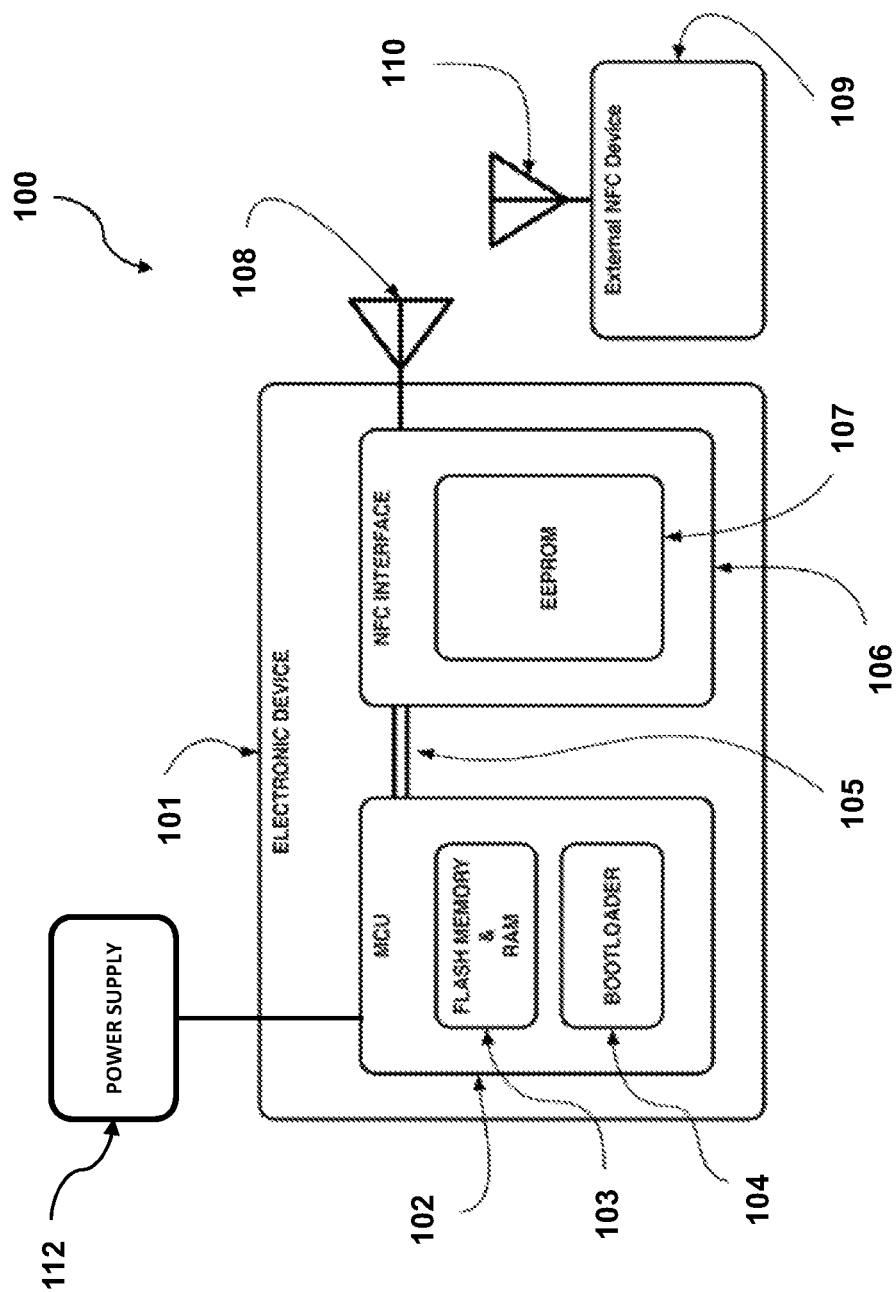
FIG. 1 depicts a system that includes an electronic device equipped with a microcontroller (MCU) and near-field-communications (NFC) capabilities, in accordance with embodiments of the present disclosure.

Embodiments of the present disclosure are described below with reference to the accompanying figures and include systems, methods, and apparatuses. The features and advantages that are explained are illustrated by way of example, and not by way of limitation. One of ordinary skill in the art will recognize that there are additional features and advantages provided by this invention beyond those described herein.

Some embodiments of the present disclosure can provide a method by which a microcontroller (MCU) bootloader can use an inexpensive passive near field communication (NFC) interface to program its flash memory with new (e.g., additional and/or updated) firmware. This allows an external NFC transmitter to push data and/or new firmware to the device in order to program and/or configure the device. This approach can allow for the device to be (re)programmed many times during its lifecycle by the manufacturer, supplier, developer or customer: after manufacture, during transit through the supply-chain, during solution development or post-deployment.

MCU architectures can be (re)programmed with instructions (e.g. firmware) that are stored in a computer-readable medium (e.g. flash memory) and subsequently executed every time the MCU restarts. To facilitate this, a programming device is used to connect to the MCU and send the new instructions for the MCU to store. The same programming device is sometimes also used in a debug mode to control and monitor the execution of instructions on an MCU in order to analyze its operation. Different standards exist for this such as "In Circuit Serial Programming" (ICSP), "Joint Test Action Group" (JTAG), "Serial Wire Debug" (SWD), "Open Serial and Debug Adapter" (OpenSDA), STLink and others. However, use of the programming device can require a power source to be connected. Embodiments of the present disclosure can provide a solution to this problem.

Some embodiments of the present disclosure can provide a method by which a microcontroller (MCU) can be programmed with new instructions (e.g. firmware) using a programmer that is wirelessly connected using Near Field Communications (NFC). The same programmer can also be used in a debug mode using the same NFC interface. When not in programming or debug mode, the programmer can optionally be used as a communications interface by the MCU. This allows an external NFC transmitter to push new firmware to the MCU, debug the MCU operation, and otherwise communicate with the MCU during normal operation.

Embodiments of the present disclosure can provide numerous advantages. For example, embodiments of the present disclosure can remove the costly need for a manufactured electronic device to be physically connected to a programming-device in order to install and configure firmware. Because the NFC interface is low-cost, it can be added to the design of every device where it is then also available for use by device applications. For example, it can be made a permanent addition to the design of electronic devices. In some embodiments, the NFC interface can be used in relation to supply-chain tracking, removing the need for additional spend on additional supply-chain tracking solutions associated with, for example electronic devices that include the NFC interface. NFC transmitters are now being built into a myriad of devices (including mobile phone handsets), therefore programming does not require expensive dedicated equipment as has previously been required.

FIG. 1 depicts a system 100 that can include an electronic device 101 equipped with Microcontroller (MCU) and Near-Field-Communications (NFC) capabilities, in accordance with embodiments of the present disclosure. The system 100 can utilize software, hardware, firmware, and/or logic to perform a number of functions described herein. FIG. 1 depicts one possible configuration for an electronic device 101 configured with a microcontroller (MCU) 102 and NFC interface 106. The MCU 102 has both device memory 103 (e.g., non-transitory computer-readable medium (CRM)) that can be written-to, and a bootloader 104 that can write to the device memory 103. The MCU 102 can include a processor (not shown) that can execute instructions (e.g., computer-readable instructions (CRI)) stored on the device memory 103. The bootloader 104 can communicate with the NFC interface 106 via the communications link 105. For example, a communication protocol, such as, Serial Peripheral Interface (SPI) and/or Inter-Integrated Circuit (I2C) can be suitable for use with the communications link 105.

The NFC interface 106 can be in communication with interface memory 107 (e.g., Electrically Erasable Programmable Read-Only Memory (EEPROM)) to which data can be written-to/read-from by either the MCU 102 and/or an external NFC device 109 that can communicate with (e.g., can be in communication with) the NFC interface 106 (e.g., via the antennas 108 and 110). In an example, the NFC interface 106 can be equipped with the interface memory 107 and the interface memory 107 can be configured to store data received from the external NFC device 109. In some embodiments, the data received from the external NFC device 109 can be included in the signal received from the external NFC device 109. For example, a signal can be transmitted from the external antenna 110 to the antenna 108, or vice versa, which includes data (e.g., CRI).

An electronic device 101, such as the one depicted in FIG. 1 can be configured as follows, in accordance with embodiments of the present disclosure. In some embodiments, a power supply 112 (e.g., a battery) can be coupled with the electronic device 101 and/or the MCU 102 and configured to provide power to the MCU 102. In some embodiments, when no power is provided to the electronic device 101 via the power supply 112, the MCU 102 will not operate, however, the NFC interface 106 can still operate in passive mode. For example, when no power is provided to the electronic device 101 and/or to the MCU 102, the MCU 102 may be inactive and the NFC interface 106 can operate in a passive mode.

The antenna 108 can be in communication with the NFC interface and can be configured to be energized by a signal received from the external NFC device 109. In an example, the antenna 108 can be energized by the external NFC device 109 in an active mode via inductive charging. In an example, the antenna 108 can provide power to the interface memory 107 of the NFC interface 106 via inductive charging. This can allow an external NFC device 109 to write data to the interface memory 107 of the NFC interface 106, from where it can be read by either the MCU 102 or an external NFC device 109.

In some embodiments, the antenna 108 can provide power to the MCU 102 via inductive charging. For example, if adequate power is made available through the energized antenna 108, the MCU 102 can also be operated in a restricted mode (e.g., mode that is not at full capacity) or full capacity mode. In some embodiments, the MCU 102 can be operated in the restricted mode based on an amount of power provided to the MCU 102 via the antenna 108 and/or NFC interface 106 exceeding a threshold. In some embodiments, the MCU 102 can be operated in the full capacity mode based on an amount of power provided to the MCU 102 via the antenna 108 and/or NFC interface 106 exceeding a threshold.

In some embodiments, when power is supplied to the electronic device 101 (e.g., through the energy harvesting function associated with the NFC interface 106 via inductive charging from another source), the MCU 102 can begin its startup process. This can include execution of a bootloader 104 that is stored somewhere within the MCU 102. In an example, the bootloader 104 can be executed in response to an amount of power being provided to the MCU 102 via the antenna 108 and/or the NFC interface 106 exceeding a threshold value. In some embodiments, the bootloader 104 can be executed prior to the execution of firmware stored in the device memory 103. As discussed herein, the bootloader 104 can be stored within the MCU 102, for example, in read-only memory (ROM), Flash, etc.

In some embodiments, the bootloader 104 can be part of the chip architecture. The bootloader 104 can be capable of communicating with an external NFC device 109 via the NFC interface 106 (e.g., facilitated by the communications link 105 and antennas 108 and 110) to download new firmware to write into the device memory 103. When the download is complete, the MCU 102 boot process can continue and eventually can start execution of the downloaded firmware stored in the device memory 103. The firmware can, for example, contain a next-stage bootloader, a single application and/or an entire Operating System (OS), which can be capable of loading and executing other applications. Both the bootloader 104 and the firmware executing from device memory 103 can have access to data stored in the interface memory 107 of the NFC interface 106. This can contain configuration information that has been previously written by the MCU 102 or an external NFC device 109.

In some embodiments, the NFC interface 106 can be used to track the electronic device 101. In an example, the NFC interface can be used in relation to supply-chain tracking, removing the need for additional spend on additional supply-chain tracking solutions associated with, for example electronic devices that include the NFC interface 106. For example, because the NFC interface 106 can operate in a passive mode, an external NFC interface 109 can interact with the NFC interface 106 while not requiring the electronic device 101 that includes the NFC interface to be powered on via an external source (e.g., power supply 112). This can be beneficial in a circumstance where the electronic device 101 is being passed through a supply chain (e.g., as the electronic device 101 is being constructed, repaired, etc.), for example. As the electronic device is passed through the supply chain, one or more external NFC devices 109 can be disposed along particular portions of the supply chain. In an example, as the electronic device 101 passes within proximity of an external NFC device 109, the antenna 108 can provide power to the NFC interface 106 via inductive charging. As previously discussed, the antenna 108 can provide power to the NFC interface 106 and/or to the electronic device 101 via inductive charging as a result of the antenna 108 being disposed in a field produced by the external antenna 110 of the external NFC device 109.

Upon providing power to the NFC interface 106, interface memory 107 associated with the NFC interface 106 and/or the device memory 103 associated with the MCU 102 can be accessed by the external NFC device 109. In some embodiments, the external NFC device can be in communication with a processor and memory (not shown) and can access data stored on one or more of the memories 103, 107. Such data can include, for example, a device identification, serial number, model number, etc. Accordingly, data associated with the electronic device 101 can be associated with data stored on the external NFC device 109, such as a location associated with the external NFC device 109, etc. Thus, a location of the electronic device 101 can be tracked by the external NFC device 109.

Figure 2:
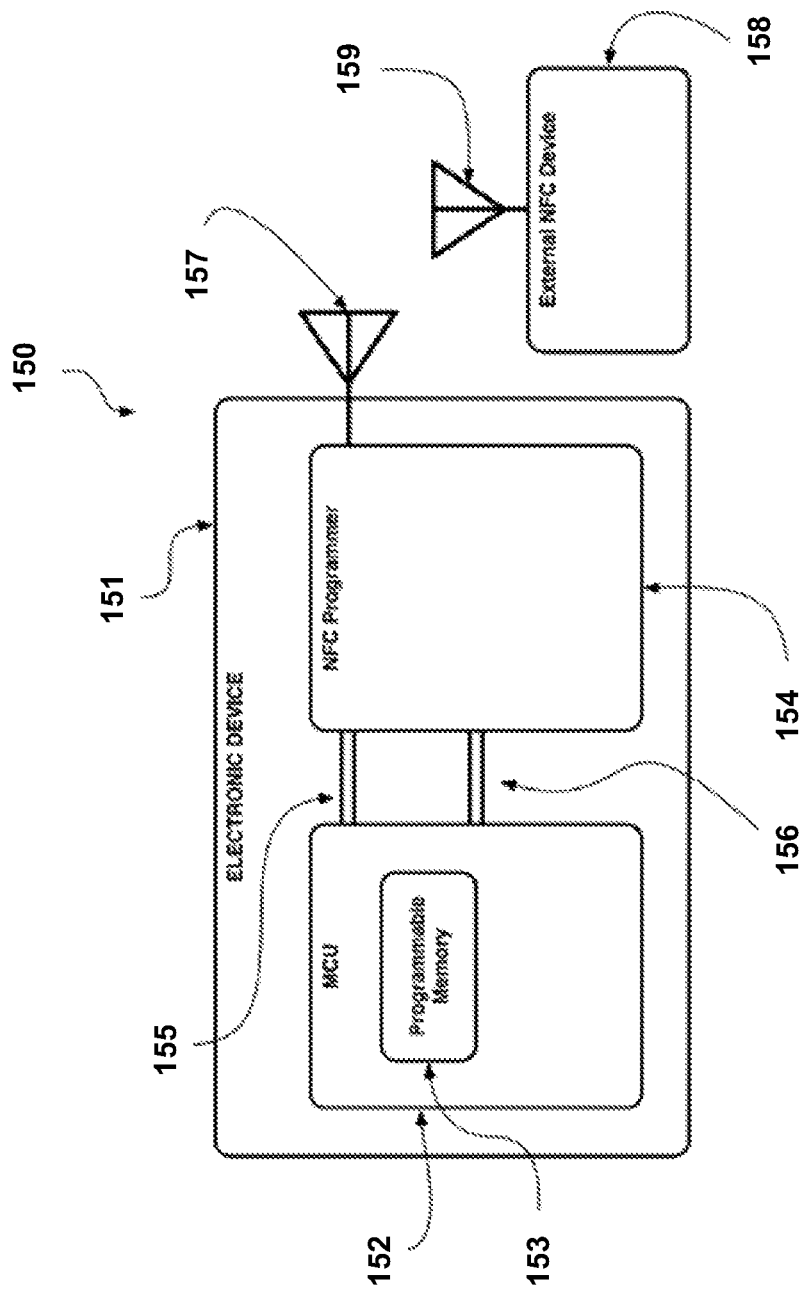
FIG. 2 depicts a system that includes an electronic device equipped with an MCU and an NFC programmer, in accordance with embodiments of the present disclosure.

FIG. 2 depicts a system 150 that can include an electronic device 151 equipped with an MCU 152 and a Near Field Communications (NFC) programmer 154, in accordance with embodiments of the present disclosure. The system 150 can use software, hardware, firmware, and/or logic to perform a number of functions described herein. FIG. 2 depicts one possible configuration for an electronic device 151 configured with MCU 152 and NFC programmer 154. The MCU 152 has programmable memory 153 (e.g., non-transitory computer-readable medium (CRM)) that stores instructions, which are executed by the MCU. In an example, the programmable memory 153 can be included in the MCU 152. The programmable memory 153 can be in communication with both the NFC programmer 154 and the MCU 152 and can be configured to store data received from the external NFC device. The data can be included in a signal received from the external NFC device 158, as discussed herein.

The MCU 152 can include a processor (not shown) that can execute instructions (e.g., computer-readable instructions (CRI)) stored on the programmable memory 153. The MCU and/or the programmable memory 153 is connected to (e.g., is in communication with) the NFC programmer 154 by means of the programming interface 155 (e.g. "In Circuit Serial Programming" (ICSP), "Joint Test Action Group" (JTAG), "Serial Wire Debug" (SWD), "Open Serial and Debug Adapter" (OpenSDA), STLink, etc.). There may also be a secondary connection 156 (e.g. Serial Peripheral Interface (SPI), Inter-Integrated Circuit (I2C), etc.) between the MCU 152 and the NFC programmer 154. The electronic device 151 is able to communicate with an external NFC device 158 by means of the NFC programmer 154 using the antennas 157 and 159. For example, instructions, commands, etc. can be received from the external NFC device 158 by the NFC programmer 154, as discussed herein. In some embodiments, the antennas 157, 159 can be in communication with the electronic device 151 and the external NFC device 158, respectively. In an example, the antenna 157 can be in communication with the NFC programmer 154 and can be configured to communicate with the external NFC device 158.

An electronic device 151, such as the one depicted in FIG. 2, can operate in one of several modes, which are discussed herein, in accordance with embodiments of the present disclosure. When in "programming mode," new instructions can be written into the programmable memory 153 by the NFC programmer 154 by means of the programming interface 155. These instructions can be sent to the NFC programmer 154 by the external NFC device 158 and security procedures may be in place to prevent unauthorized operation. For example, an identifying feature (e.g., password, biometric identifier, etc.) can be received by the electronic device 151 and/or the external NFC device 109 to allow the electronic device 151 (e.g., NFC programmer 154, MCU 152) to be accessed by the external NFC device 158, or vice versa.

When in "debug mode", MCU 152 operation can be controlled using functions (e.g., debugging commands) such as start, stop, pause, step-through, breakpoint, etc. and can have its state inspected (e.g. memory and registers read) by an external NFC device 158 via the NFC programmer 154 by means of the programming interface 155. Accordingly, the external NFC device 158 can be used to debug the electronic device 151 (e.g., instructions stored on the programmable memory 153) via the NFC programmer 154. In an example, instructions associated with a debug mode can be run on the external NFC device 158 and can be used to access and/or control the MCU 152 via the NFC programmer 154 to perform debugging activities. Security procedures may be in place to prevent unauthorized operation, as discussed herein.

When in "operating mode", the MCU 152 can use the NFC programmer 154 via the secondary connection 156 to communicate with an external NFC device 158. For example, data can be transferred via the secondary connection 156 and can be exchanged via the electronic device 151 and the external NFC device 158 via the NFC programmer 154. For example, data can be exchanged between the programmable memory 153 and a memory and/or microcontroller included on the external NFC device 158. In this mode, the NFC programmer 154 behaves as an NFC interface and security procedures may be in place to prevent unauthorized operation, as discussed herein.

Figure 3:
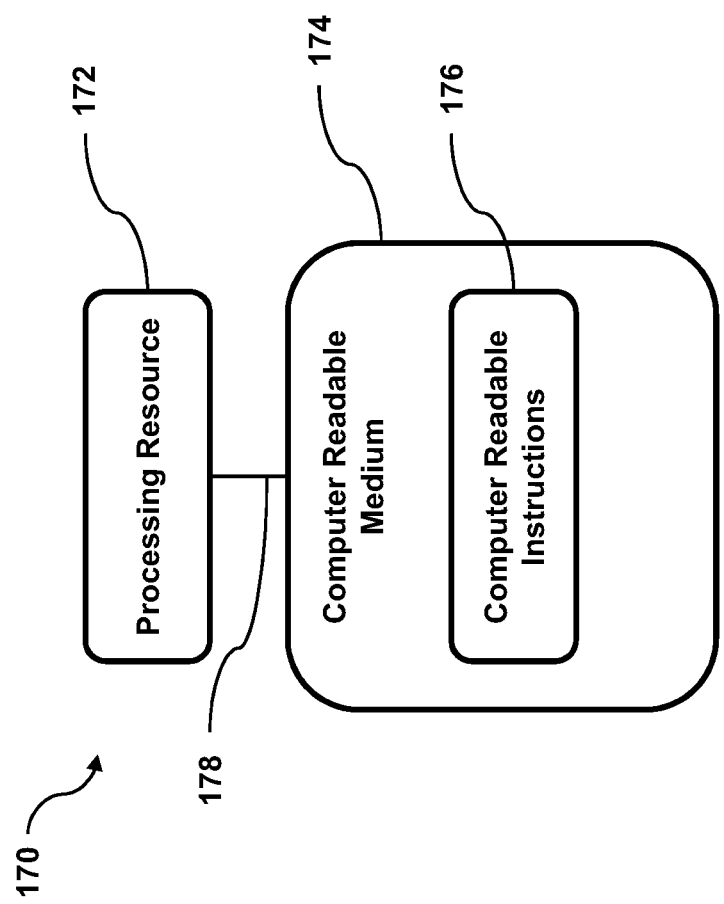
FIG. 3 depicts a diagram of an example of a computing device, according to various embodiments of the present disclosure.

FIG. 3 depicts a diagram of an example of a computing device 170, according to various embodiments of the present disclosure. The computing device 170 can utilize software, hardware, firmware, and/or logic to perform a number of functions described herein. In an example, the computing device 170 can be representative of the electronic devices 101, 151 and/or external NFC devices 109, 158.

The computing device 170 can be a combination of hardware and instructions 176 to share information. The hardware, for example can include a processing resource 172 and/or a memory resource 174 (e.g., computer-readable medium (CRM), database, etc.). A processing resource 172, as used herein, can include a number of processors capable of executing instructions 176 stored by the memory resource 174. Processing resource 172 can be integrated in a single device or distributed across multiple devices. The instructions 176 (e.g., computer-readable instructions (CRI)) can include instructions 176 stored on the memory resource 174 and executable by the processing resource 172 to implement a desired function (e.g., debug the electronic device, as discussed in reference to FIG. 2, etc.).

The memory resource 174 can be in communication with the processing resource 172. The memory resource 174, as used herein, can include a number of memory components capable of storing instructions 176 that can be executed by the processing resource 172. Such memory resource 174 can be a non-transitory CRM. Memory resource 174 can be integrated in a single device or distributed across multiple devices. Further, memory resource 174 can be fully or partially integrated in the same device as processing resource 172 or it can be separate but accessible to that device and processing resource 172. Thus, it is noted that the computing device 170 can be implemented on a support device and/or a collection of support devices, on a mobile device and/or a collection of mobile devices, and/or a combination of the support devices and the mobile devices.

The memory resource 174 can be in communication with the processing resource 172 via a communication link 178 (e.g., path). The communication link 178 can be local or remote to a computing device associated with the processing resource 172. Examples of a local communication link 178 can include an electronic bus internal to a computing device where the memory resource 174 is one of a volatile, non-volatile, fixed, and/or removable storage medium in communication with the processing resource 172 via the electronic bus.

Link 178 (e.g., local, wide area, regional, or global network) represents a cable, wireless, fiber optic, or remote connection via a telecommunication link, an infrared link, a radio frequency link, and/or other connectors or systems that provide electronic communication. That is, the link 178 can, for example, include a link to an intranet, the Internet, or a combination of both, among other communication interfaces. The link 178 can also include intermediate proxies, for example, an intermediate proxy server (not shown), routers, switches, load balancers, and the like.

Embodiments are described herein of various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

What is claimed:

1. An electronic device, comprising:
a microcontroller, wherein the microcontroller includes a bootloader, a device memory, and a processor configured to execute instructions stored on the device memory;
a near field communications (NFC) interface in communication with the microcontroller;
an antenna in communication with the NFC interface, configured to be energized by a signal received from an external NFC device, wherein the antenna is energized by the external NFC device via inductive charging; and
an interface memory in communication with the NFC interface, wherein the interface memory is configured to store data received from the external NFC device, the data included in the signal received from the external NFC device, wherein:
the antenna provides power to the interface memory on the NFC interface and to the microcontroller via the inductive charging;
the bootloader is executed by the microcontroller in response to the power provided to the microcontroller; and
the bootloader communicates with the external NFC device via the NFC interface.

2. The electronic device of claim 1, wherein the microcontroller is inactive when no power is provided to the electronic device via a power supply.

3. The electronic device of claim 2, wherein the NFC interface operates passively when no power is provided to the electronic device via the power supply.

4. The electronic device of claim 3, wherein the power supply includes a battery.

5. The electronic device of claim 1, wherein the microcontroller operates in a restricted mode in response to the power provided to the microcontroller.

6. The electronic device of claim 1, wherein the microcontroller operates in a full capacity mode in response to the power provided to the microcontroller.

7. An electronic device, comprising:
a microcontroller;
a near field communications (NFC) programmer in communication with the microcontroller;
an antenna in communication with the NFC programmer configured to communicate with an external NFC device; and a programmable memory included in the microcontroller, the programmable memory in communication with the NFC programmer via a programming interface and further in communication with the microcontroller, wherein:

the programmable memory is configured to store data received from the external NFC device, the data being included in a signal received from the external NFC device, the electronic device includes a programming mode where an instruction is written into the programmable memory, the instruction being included in a signal received from the external NFC device via the antenna, and a security procedure is implemented to prevent unauthorized access to the programmable memory by the external NFC device.

8. The electronic device of claim 7, wherein the NFC programmer is in communication with the programmable memory via a secondary connection.

9. The electronic device of claim 8, wherein electronic device includes an operating mode where data is exchanged between the electronic device and the external device via the NFC programmer and the secondary connection.

10. An electronic device, comprising:

a microcontroller, wherein the microcontroller includes, a device memory, and a processor configured to execute instructions stored on the device memory;

a near field communications (NFC) interface in communication with the microcontroller, wherein the electronic device includes a debug mode, wherein operation of the microcontroller is controlled by an external NFC device to debug the microcontroller, and wherein a security procedure is implemented to prevent unauthorized access to the device memory by the external NFC device;

an antenna in communication with the NFC interface, configured to be energized by a signal received from an external NFC device;

an interface memory in communication with the NFC interface, wherein the interface memory is configured to store data received from the external NFC device, the data included in the signal received from the external NFC device; and a power supply, electrically coupled with the electronic device, configured to provide power to the microcontroller, wherein the microcontroller is inactive when no power is provided to the electronic device via the power supply and the NFC interface operates in a passive mode when no power is provided to the electronic device via the power supply.

* * * * *